United States Patent [19]

Leighton et al.

[11] Patent Number: 5,066,749
[45] Date of Patent: Nov. 19, 1991

[54] HYDROPHOBICALLY-MODIFIED POLYCARBOXYLATES AND PROCESS FOR THEIR PREPARATION

[75] Inventors: John C. Leighton, Flanders; Carmine P. Iovine, Bridgewater, both of N.J.; Michael P. Aronson, West Nyack, N.Y.; David L. Elliott, Hawthorne, N.J.

[73] Assignee: National Starch and Chemical Investment Holding Corporation, Wilmington, Del.

[21] Appl. No.: 580,695

[22] Filed: Sep. 11, 1990

[51] Int. Cl.$^5$ .................. C08F 34/02; C08F 122/04; C08F 222/04; C08F 8/14
[52] U.S. Cl. .................. 526/271; 252/174.24; 526/266; 526/270; 526/317.1; 526/318.2; 526/318.4; 526/319; 526/329.5; 526/329.7
[58] Field of Search .................. 526/271, 317.1, 318.2, 526/318.4, 329.5, 260; 252/174.24

[56] References Cited

U.S. PATENT DOCUMENTS

| | | | |
|---|---|---|---|
| 3,719,647 | 3/1973 | Hardy et al. | 260/86.1 R |
| 3,915,921 | 10/1975 | Schlatzer, Jr. | 526/238.23 |
| 3,940,351 | 2/1976 | Schlatzer, Jr. | 524/795 |
| 4,390,670 | 6/1983 | Walinsky | 526/79 |
| 4,559,159 | 12/1985 | Denzinger et al. | 252/174.24 |
| 4,612,352 | 9/1986 | Schafer et al. | 525/404 |
| 4,686,254 | 8/1987 | Lochhead | 524/99 |
| 4,797,223 | 1/1989 | Amick et al. | 252/174.23 |
| 4,874,537 | 10/1989 | Peterson et al. | 252/99 |

FOREIGN PATENT DOCUMENTS

| | | |
|---|---|---|
| 0301882 | 2/1989 | European Pat. Off. |
| 0326792 | 8/1989 | European Pat. Off. |
| 0344929 | 12/1989 | European Pat. Off. |
| 0346995 | 12/1989 | European Pat. Off. |
| 62164278 | 1/1989 | Japan . |
| 668539 | 3/1952 | United Kingdom . |
| 758203 | 10/1956 | United Kingdom . |

*Primary Examiner*—Joseph L. Schofer
*Assistant Examiner*—Fred Zitomer
*Attorney, Agent, or Firm*—Mary E. Porter

[57] ABSTRACT

This invention provides interpolymers comprising repeating units of the structure:

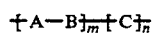

wherein m is a mole fraction from 0.70 to 0.95; n is a mole fraction from 0.05 to 0.30; A is derived from at least one ethylenically unsaturated carboxylic acid monomer; B is derived from at least one ethylenically unsaturated carboxylic acid monomer and B is not A; and C is:

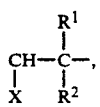

wherein X is —H,

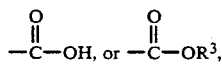

or a combination thereof, $R^1$ is —H, —CH$_3$, or —(CH$_2$)$_q$CH$_3$, or a combination thereof, and q is 1-5; $R^2$ is:

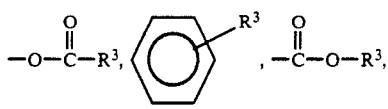

or $R^3$, or a combination thereof, and $R^3$ is C$_8$–C$_{18}$ linear or branched alkyl chain; the interpolymer being prepared by polymerizing the monomers in a solvent system in which the monomers and interpolymer are soluble. Also provided is a polymerization process for preparing hydrophobically-modified polycarboxylate builders which are compatible with liquid detergent formulations.

12 Claims, 4 Drawing Sheets

HYDROPHOBICALLY-MODIFIED POLYCARBOXYLATES AND PROCESS FOR THEIR PREPARATION

BACKGROUND OF THE INVENTION

This invention relates to hydrophobically-modified polycarboxylates ("the polycarboxylates"). The polycarboxylates are novel polymers of at least two different ethylenically unsaturated carboxylic acid monomer(s) and one or more ethylenically unsaturated comonomer(s), having a $C_8$–$C_{18}$ linear or branched alkyl chain ("hydrophobic monomer(s)"). When used as builders in liquid detergent compositions these polycarboxylates do not cause separation into different phases, thus do not require the addition of a compatibilizing agent to the detergent.

This invention also relates to a process for polymerization whereby suitable hydrophobically-modified polycarboxylates are prepared. This process unexpectedly permits solution polymerization of hydrophobically-modified monomers and carboxylic acid-containing monomers at hydrophobic monomer levels as low as 5 mole percent of the total monomers. Both the monomers and the newly formed polymer remain in solution during polymerization. Furthermore, the polycarboxylates obtained thereby have a more homogeneous distribution of all monomer units in the polymer chain than those prepared by other processes from identical starting materials. Better liquid detergent stability is achieved by the use of these homogeneous polycarboxylates.

It is well known that the selection of one polymerization process over another may affect polymer qualities as much as, if not more than, other variables, such as monomer selection, monomer ratios and the like. For example, substantially homogeneous acrylate-maleate copolymers have been prepared by controlling the rate of addition of an acrylic monomer to a solution of maleic anhydride in a chain-transfer solvent so as to maintain the monomers and newly formed copolymer in solution. U.S. Pat. No. 4,390,670, issued June 28, 1983, to Walinsky.

Furthermore, copolymers prepared by a single charge, batch process in benzene are not suited for use herein, even though these polymers are derived from comonomers which include an unsaturated carboxylic acid and acrylic esters having aliphatic chain length of 10 to 30 carbon atoms. See, U.S. Pat. No. 3,915,921, issued Oct. 28, 1975 to Schlatzer, Jr. The Schlatzer copolymers are reported to be useful primarily as thickeners for electrolyte-containing materials, including ionic detergents. The Schlatzer copolymers may comprise from 5 to 50 weight percent acrylic ester monomer. The copolymers are insoluble in benzene with the result that the copolymer is recovered by centrifuging the reaction mixture. The copolymer is preferably prepared with an additional, crosslinking monomer so as to provide maximum viscosity.

U.S. Pat. No. 3,940,351, issued Feb. 24, 1976 to Schlatzer, Jr., teaches the preparation of copolymers of an unsaturated copolymerizable carboxylic acid monomer and 10 to 30 carbon atom alkyl acrylate esters in a halogenated solvent (preferably one which is a solvent for the monomers but not for the polymer) by a single charge batch process wherein the polymer is recovered by centrifuging the reaction mixture. Maximum polymer viscosity in electrolyte-containing aqueous media is an object of the patent, and optional crosslinking monomers are preferably employed to achieve this object. The Schlatzer copolymers are compositionally and functionally distinct from the polycarboxylates prepared by the process disclosed herein. The Schlatzer copolymers are designed to thicken, whereas the polycarboxylates herein advantageously contribute little to the viscosity of isotropic liquid detergents.

Detergent compositions are generally a blend of a surfactant(s), builder(s) and, optionally, ion exchanger(s), filler(s), alkali(es), anticorrosion material(s), antiredeposition material(s), bleach(es), enzyme(s), buffer(s), optical brightener(s), fragrance(s), solvent(s) and other components selected for particular applications.

Builders are used to improve the effectiveness of detergent compositions and thereby improve their whitening powers. The manner in which detergent builders improve the cleaning powers of detergent compositions is related to a combination of factors such as emulsification of soil particles, solubilization of water insoluble materials, promoting soil suspension in the wash water so as to retard soil redeposition, sequestering of metallic ions, and the like. Builders enhance (or "build") the cleaning efficiency of surfactants by forming complexes with hard water ions, aiding in keeping soil from redepositing on fabric being washed and buffering or moderating the pH of wash water.

Many materials are or have been used as builders in detergent formulations. Compositions and materials change frequently as formulators attempt to improve performance of cleaning while offering greater convenience in handling as well as keeping materials cost as low as possible. As heavy duty liquid laundry detergents gain market share, the need for effective nonphosphate builders which are compatible with liquid detergents becomes more acute.

Detergent builders for liquid detergents must be effective, compatible with the liquid formulation and shelf-stable. Builders which precipitate from the liquid, or cloud or gel the liquid, or cause phase separation or solid settlement initially or upon storage, are not suitable for use in liquid detergents unless an effective compatibilizing agent can be found. However, structured liquid detergents, unlike isotropic or single phase liquid detergents, generally contain builders and other components as a suspended phase, have a thick, cloudy appearance, and do not require phase compatibility. Powdered detergent formulations, which have less demanding requirements for builder compatibility and stability than liquids, can employ a greater variety of more effective builders without the need for an added compatibilizing agent.

Citric acid and its salts are used commercially as builders in liquid detergent formulations. While very compatible in liquids, the citrates do not bind calcium as effectively as the builders used in powdered detergents. Also used commercially are the liquid detergent builders comprising ether carboxylate salts (i.e., tartrate monosuccinate and disuccinate salts) which are disclosed in U.S. Pat. No. 4,663,071, issued May 5, 1987 to Bush, et al. Among the polymeric materials that have been suggested for use as liquid detergent builders are polymeric polycarboxylic acids. U.S. Pat. No. 4,797,223, which issued Jan. 10, 1989 to Amick, et al., discloses water soluble polymers with surfactant radicals distributed along a carboxylated polymer chain. The polymer may contain surfactant end groups. The surfactant radical is selected from a group of radicals having poly(alkyleneoxy) blocks characterized by a hydrophobic portion and a hydrophilic portion.

U.S. Pat. No. 4,612,352 which issued Sept. 16, 1986 to Schafer, et al., discloses water soluble or water dispersible graft polymers having at least 10 percent, by weight, of a hydrophilic graft constituent bonded to carbon and at least one hydrophobic radical bonded to the graft constituent by a polyglycol ether chain. These graft polymers contain pendant surfactant-type groups.

U.S. Pat. No. 4,559,159, which issued Dec. 17, 1985 to Denzinger, et al., discloses polymers of ethylenically unsaturated mono- and di-carboxylic acids, together with not more than 15 percent, by weight, of carboxyl-free monomers, having a terminal hydroxy radical and one or more alkylene oxide radicals.

Each of these builder compositions achieve liquid detergent formulation compatibility through the presence of pendant surfactant-type radicals on the carboxylated polymer chain. It is unexpected that liquid detergent compatibility may be achieved without employing surfactant radicals in the polymer. In place thereof, the polycarboxylates disclosed herein comprise the polymerized residue of hydrophobic alkyl ester monomers and hydrophilic carboxylic acid monomers, and are polymers having overall surfactant character.

Notwithstanding the existence of a variety of liquid detergent builders, there remains a continuing need to identify improved non-phosphorus sequestering agents, such as the unique hydrophobically-modified polycarboxylates disclosed herein.

SUMMARY OF THE INVENTION

This invention provides interpolymers comprising repeating units of the structure:

wherein m is a mole fraction from 0.70 to 0.95; n is a mole fraction from 0.05 to 0.30; A is derived from at least one ethylenically unsaturated carboxylic acid monomer; B is derived from at least one ethylenically unsaturated carboxylic acid monomer and B is not A; and C is wherein X is —H, or a combination thereof, $R^1$ is —H, —$CH_3$, or —$(CH_2)_q CH_3$, or a combination thereof, and q is 1–5; $R^2$ is or $R^3$, or a combination thereof, and $R^3$ is a $C_8$–$C_{18}$ linear or branched alkyl chain; the interpolymer being prepared by polymerizing the monomers in a solvent system in which the monomers and interpolymer are soluble. A homogeneous interpolymer is provided by slowly adding the monomer from which C is derived to the carboxylic acid monomer(s) over a sufficient period of time to instantaneously and uniformly copolymerize the monomers.

The process may comprise the step of simultaneously adding at least one ethylenically unsaturated carboxylic acid (from which A or B is derived) along with a monomer charge from which C is derived to an initial charge comprising up to 100% by weight, of the monomer(s) from which A or B is derived. Following polymerization, the polymer may be extracted into an aqueous solvent, followed by azeotropic solvent removal. The polymer also may be isolated as a dry solid.

The polycarboxylates suitable for use in liquid detergent formulations are preferably prepared according to the process herein by solution polymerization of acrylic acid, maleic acid and stearyl or lauryl methacrylate in toluene and extracting the interpolymer into water by azeotropic solvent removal.

The polycarboxylates may be utilized in the acid, salt (e.g., sodium, potassium, ammonium, monoethanolamine or triethanolamine), ester (e.g., alkyl or cycloalkyl) or anhydride form. The number average molecular weight of these polymers in the anhydride form is between 1,000 and 1,000,000. At lower levels of usage in detergent compositions (e.g., less than 2%), the polycarboxylates are also useful as anti-redeposition agents.

The polycarboxylates of this invention are particularly suited for use in liquid detergent compositions because they do not require the addition of a compatibilizing agent to stabilize the detergent composition and prevent phase separation upon storage. As a further advantage, the interpolymers herein which contain at least 2 types of carboxylic acid monomers (e.g., maleic acid and acrylic acid) have a significantly higher carboxylic acid density (e.g., 10.3 meq carboxylic acid/gram of interpolymer versus 5.4 meq carboxylic acid/gram of copolymer for the Schlatzer 1:1 copolymer) than those copolymers which contain only one type of carboxylic acid (e.g., Schlatzer copolymers). Therefore, the interpolymers herein have higher calcium binding capacity and are more effective detergent builders.

DESCRIPTION OF THE DRAWINGS

FIG. 1 illustrates calcium sequestration by polycarboxylates at an initial calcium ion load of 120 ppm. In this figure, the log of the free calcium ion concentration remaining after treatment is plotted against the quantity of polycarboxylate used in the treated samples. Test methods and data used to generate this graph are set forth in Example 2 and Table II, herein.

FIGS. 2–4 are derived from Example 5 and Table VI, herein. In the Figures, "2 hr/2 hr" refers to addition times for acrylic acid/lauryl methacrylate monomer charges.

DESCRIPTION OF THE PREFERRED EMBODIMENTS

Hydrophobically-Modified Polycarboxylates

This invention provides interpolymers comprising repeating units of the structure:

wherein m is a mole fraction from 0.70 to 0.95; n is a mole fraction from 0.05 to 0.30; A is derived from at least one ethylenically unsaturated carboxylic acid monomer; B is derived from at least one ethylenically unsaturated carboxylic acid monomer and B is not A; and C is:

wherein X is H, or a combination thereof; $R^1$ is —H, —$CH_3$, or —$(CH_2)_q CH_3$, or a combination thereof, and q is 1–5; $R^2$ is:

or $R^3$, or a combination thereof, and $R^3$ is a $C_8$–$C_{18}$ linear or branched alkyl chain; the interpolymer being prepared by polymerizing the monomers in a solvent system in which the monomers and interpolymer are soluble. A homogeneous interpolymer is provided by slowly adding the monomer from which C is derived to the carboxylic acid monomer(s) over a sufficient period of time to instantaneously and uniformly copolymerize the monomers.

The polycarboxylates preferred in detergents are polymers comprising repeating units of the structure:

wherein A is derived from at least one ethylenically unsaturated mono- or di-carboxylic acid monomer; B is derived from at least one ethylenically unsaturated mono- or di-carboxylic acid monomer and B is not A; $R^1$ is —H, —$CH_3$, or wherein $R^4$ is a $C_8$–$C_{18}$ linear or branched alkyl chain; $R^3$ is —H,—$CH_3$, or m is a molar ratio from 0.70 to 0.95; and n is a molar ratio from 0.05 to 0.30.

For the purposes of this invention, the salt, acid, ester or anhydride form, or a combination thereof, may be employed.

The molecular weight corresponding to 9 to 9,000 repeating units of the copolymers ranges from about 1,000 to 1,000,000. The ranges of the molecular weights of the copolymers are limited only by the solution method of preparation and the compatibility and effectiveness of the polymer as a builder. The corresponding number average molecular weight of the fully neutralized sodium salt of the copolymer ranges from about 1,200 to 1,200,000.

In a preferred embodiment the sodium carboxylate salt of the polymer is prepared by dissolving the anhydride in water and neutralizing it with sodium hydroxide. The practitioner will recognize that if the anhydride form of the polymer is incorporated into a detergent formulation, hydrolysis to the carboxylic acid form will occur under the alkaline conditions which are typical of formulating, washing or cleaning conditions. The sodium, potassium, ammonium, monoethanolamine or triethanolamine carboxylate salts of the polymer are preferred. Although the polyvalent cations responsible for water hardness are generally not employed, any organic or inorganic base or salt forming cation may be utilized in preparing the salt of the polymer.

In isotropic liquid detergents, the monoethanolamine salt is preferred, particularly at a pH above 10 and at builder concentrations of 8% or more. At a pH of 10 or greater and at higher builder concentrations (e.g., 8–10% builder), monoethanolamine must be used for compatibility.

In a second preferred embodiment, a $C_1$–$C_{12}$ alkyl or a $C_5$–$C_{12}$ cycloalkyl (having at least one five- or six-membered ring substituent) ester derivative of the moiety derived from the maleic anhydride (or acid) comonomer, is formed by reacting the polymer with an excess of $C_1$–$C_{12}$ alcohol. This reaction may be conducted in an aprotic solvent (e.g., toluene). Suitable alkyl esters may be prepared with any alkyl alcohol (e.g., lauryl alcohol); and suitable cycloalkyl esters may be prepared with any cycloalkyl alcohol (e.g., cyclohexanol).

Structures A and B represent a repeating unit derived from at least two different copolymerizable carboxylic acid comonomers, preferably selected from the group consisting of unsaturated carboxylic acids and unsaturated dicarboxylic acids and their anhydrides and esters. Structures A and B may consist of one or more of the selected comonomer(s). Certain of these comonomers (e.g., acrylic acid and maleic acid) are known to form homopolymers and copolymers which have commercial utility as powdered detergent builders (e.g., acrylic acid/maleic acid copolymer and polyacrylic acid). However, these builders generally are neither compatible nor stable in liquid detergents, particularly at higher builder concentration levels.

The carboxylic monomers useful in the production of the polymers of this invention are the olefinically unsaturated carboxylic acids containing at least one activated carbon-to-carbon olefinic double bond, and at least one carboxyl group, that is, an acid containing an olefinic double bond which readily functions in polymerization because of its presence in the monomer molecule either in the alpha-beta position with respect to a carboxyl group, or as a part of a terminal methylene grouping. Olefinically-unsaturated acids of this class include such widely divergent materials as the acrylic acids typified by acrylic acid itself, methacrylic acid, ethacrylic acid, alpha-chloro-acrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule.

Maleic anhydride and the other acid anhydrides useful herein may contain a substituent, such as hydrogen, halogen or hydroxyl or alkyl, aryl, alkaryl, aralkyl, and cycloalkyl groups, such as methyl, ethyl, propyl, octyl, decyl, phenyl, tolyl, xylyl benzyl, cyclohexyl, and the like. The preferred carboxylic monomers for use in this invention are the monoolefinic acrylic acids having a substituent selected from the class consisting of hydroigen, halogen and hydroxyl groups, monovalent alkyl radicals, monovalent aryl radicals, monovalent aralkyl radicals, monovalent alkaryl radicals and monovalent cycloaliphatic radicals. Of this class, acrylic acid itself is most preferred because of its generally lower cost, ready availability, and ability to form superior polymers. Another particularly preferred carboxylic monomer is maleic anhydride.

Structure C represents a repeating unit derived from at least one ethylenically unsaturated monomer(s), having a $C_8-C_{18}$ linear or branched alkyl chain. The monomer(s) are selected from $C_8-C_{18}$ alkyl esters of ethylenically unsaturated carboxylic acid(s); $C_8-C_{18}$ vinyl esters; $C_8-C_{18}$ substituted styrenes; and $C_8-C_{18}$ alpha-olefins; and mixtures thereof.

Preferred for use in detergents are alkyl acrylate monomers having long chain aliphatic groups which are derivatives of acrylic acid represented by the formula:

wherein R is a member of the class consisting of alkyl groups having from 8 to 18 carbon atoms, preferably 10 to 14 carbon atoms, and R' is hydrogen or a methyl group. Representative higher alkyl acrylic esters are lauryl acrylate and stearyl acrylate, and the corresponding methacrylates. Mixtures of two or three or more long chain acrylic esters may be successfully polymerized with the carboxylic monomers. Other alkyl esters, such as maleate esters, also may be employed.

Preferred vinyl esters of $C_8-C_{18}$ carboxylic acids include vinyl octanoate, vinyl dodecanoate, vinyl tetradecanoate, vinyl hexadecanoate and vinyl octadecanoate. Mixtures of these and/or other vinyl esters may be employed.

Preferred alpha-olefins include 1-octene, 1-nonene, 1-dodecanene, 1-tetradodecanene, 1-hexadecanene and 1-octadecanene, and the like, and mixtures thereof.

The practitioner will recognize that although certain comonomers are selected for the preferred embodiments disclosed herein, any monomers within the selected class may be utilized. Furthermore, small quantities of polyfunctional monomers may be utilized, provided that the resulting polycarboxylates retain their water solubility and effectiveness as calcium sequestrants. Examples of such polyfunctional monomers are acrylates and methacrylates of polyols, allyl and vinyl esters of polycarboxylic acids, divinyl benzene, and the like.

Other polycarboxylates, containing relatively minor amounts of one, two or more comonomer(s) in addition to the hydrophobe-containing and carboxylic acid comonomers, are intended to fall within the scope of this invention, provided that they do not render the polymer incompatible or ineffective.

PREPARATION OF THE POLYCARBOXYLATES

The polycarboxylates herein are prepared by solution polymerization wherein a charge comprising the hydrophobic monomer is slowly added to an initial charge comprising one or more unsaturated carboxylate monomer(s). Polymerization is carried out in a solvent system in which the monomers and the newly formed interpolymer are soluble. A substantially homogeneous interpolymer is provided by adding the hydrophobic monomer at a sufficiently slow rate such that copolymerization of the hydrophobic monomer is substantially instantaneous and uniform, and both the monomers and the interpolymer remain in solution.

The process for preparing the polycarboxylates comprises the steps:
a) providing an initial charge comprising up to 100%, by weight, of at least one monomer from which A or B is derived;
b) adding to the initial charge a charge comprising at least one monomer from which C is derived; and
c) polymerizing the monomers in solution in the presence of an initiator.

The process additionally may comprise the step of adding a charge of an ethylenically unsaturated carboxylic acid (from which A and/or B is derived), such as acrylic acid, simultaneously with the charge of hydrophobic monomer (from which C is derived), to the unsaturated carboxylate monomer in the reaction vessel.

The process may further comprise the extraction of the copolymer into an aqueous solvent, and/or the azeotropic removal of the solvent, or removal of solvent and isolation of the copolymer as a dry solid. The aqueous solution of the polymer may be spray-dried to yield polymer in dry form.

Any solvent or solvent system may be employed, provided the comonomers and polymer remain in solution at the ratios and percentages employed herein. A non-haloalkane organic solvent, such as toluene, is preferred.

Polymerization in solution is preferably carried out in the presence of a free radical catalyst in an open vessel under reflux at atmospheric pressure. However, the temperature may be varied from 35° C. to 130° C., under nitrogen, with or without reflux. Polymerization under reflux at 110° to 120° C. under atmospheric pressure using a free radical catalyst is generally effective in bringing a polymer yield of 95% to 100% in less than 7 hours.

Suitable catalysts include peroxygen compounds such as caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like as well as azo diisobutyryl nitrile, hereinafter referred to as azoisobutyronitrile. Other catalysts utilizable are the so-called "redox" type of catalyst and the heavy-metal activated catalyst systems. These polymers generally do not attain their maximum properties in water until converted to a partial alkali, ammonium or amine salt. The neutralizing agent is preferably a monovalent alkali such as sodium, potassium, lithium, or ammonium hydroxide or the carbonates and bicarbonates thereof, or mixtures of the same, and also amine bases.

In a preferred embodiment for small scale polymerization (e.g., 2 liter vessel) the initial charge is a mixture of maleic anhydride and toluene; the added charge is a mixture of acrylic acid and lauryl methacrylate in toluene which is added over a period from 3 to 4 hours; the temperature is 110° to 120° C.; and the polymerization is carried out under reflux. The weight average molecular weight of the interpolymer is typically about 3,000 to 15,000 and preferably less than 20,000. The practitioner will recognize that larger, commercial scale polymerization requirements often vary from those of small scale ones, and variables, such as time of addition of monomer(s), total reaction time, amount and type of initiator, temperature, and the like, will be varied to achieve optimum conditions.

DETERGENT COMPOSITIONS

The detergent formulations comprise from about 0.5 to 65% by weight of a surfactant, or a blend of surfactants, and 1 to 80% by weight of one of the builder polymers disclosed herein, or a blend of builders containing at least one of the polycarboxylate builders. In a preferred embodiment, from about 0.5 to 30% by weight of a surfactant, or a blend of surfactants, and from about 2 to 65% by weight of the polycarboxylate builder, or a blend of builders containing at least one polycarboxylate builder, are employed.

If a blend of builders is employed, the polymers disclosed herein may be present at lower percentages, provided that the total amount of builder is at least 1% of the detergent formulation. When used in conjunction with one or more co-builders, these polymers may function primarily as anti-redeposition or anti-incrustation agents (i.e., when the polymers are less than about 1% of the formulation).

Optional components of the detergent formulations include, but are not limited to, ion exchangers, alkalies, anticorrosion materials, anti-redeposition materials, optical brighteners, fragrances, dyes, fillers, chelating agents, enzymes, e.g., lipase(s), fabric whiteners and brighteners, sudsing control agents, solvents, hydrotropes, bleaching agents, bleach precursors, buffering agents, soil removal agents, soil release agents, fabric softening agent and opacifiers.

These optional components may comprise up to about 90% of the detergent formulation. Examples of these optional components, commonly used surfactants and various builders are set forth in detail in U.S. Pat. No. 4,663,071 to Bush, issued May 5, 1987, and European Patent Application No. 0 344 828 to Berthod, et al., published Dec. 6, 1989, which are hereby incorporated by reference.

Examples of structured detergent formulations in which the polymers disclosed herein may be employed as builders, alone or in combination with one or more co-builders, are set forth in detail in European Patent Application Nos. 0 301 882 to Bulfart, published Feb. 1, 1989, and 0 346 995 to Montague, et al., published Dec. 12, 1989, which are hereby incorporated by reference.

In a preferred embodiment, the polycarboxylate builder is incorporated into a liquid household laundry detergent formulation, comprising 5-50% surfactant(s), 1-55% builder(s), and 15-95% of a combination of optional ingredients, such as buffer(s), compatibilizing agent(s), enzyme(s), softener(s), antistatic agent(s), fluorescer(s), perfume(s), water and filler(s).

In a second preferred embodiment, any of the builder polymers disclosed herein are incorporated into a powdered household laundry detergent formulation, comprising 10-25% surfactant(s), 2-63% builder(s), and 12-88% optional components, such as buffer(s), enzyme(s), softener(s), antistatic agent(s), bleach(es), optical brightner(s), perfume(s), and filler(s).

In a third preferred embodiment, any of the builder polymers disclosed herein are incorporated into a liquid or a powdered detergent formulation for use in automatic dishwashing machines, comprising from about 2-6% relatively low sudsing nonionic surfactant(s) (e.g., alkoxylation products of compounds containing at least one reactive hydrogen, such as BASF-Wyandotte Corporation's Pluronic ®, Tetronic ® and Pluradot ®) 1-65% builder(s), and 29-96% optional components, such as suds control agent(s) (e.g., mono- and distearyl acid phosphates), clay(s), bleach(es), alkali(es), fragrance(s), and filler(s).

Also useful herein are any detergent formulations, used commercially or experimentally, which employ a phosphate co-builder or phosphate-replacer builder or co-builder, or any builder which functions chiefly to sequester calcium, magnesium and other polyvalent cations present in hard water. Formulations employing mixtures of builders, including phosphate-containing mixtures, are also useful.

The detergent compositions of this invention may take any of the physical forms associated with detergent compositions, such as powders, granules, cakes and liquids. They may also be produced by any of the techniques commonly employed in the manufacture of detergent compositions, including slurry-making and spray-drying processes for the manufacture of detergent powders. The builder may be incorporated in the slurry or blended with spray-dried base powder. The practitioner will recognize which formulations are best suited to the physical form selected for a particular detergent composition and adjust the formulation accordingly.

This invention is illustrated by the following examples.

EXAMPLE 1

This example illustrates the preparation of the maleic acid/acrylic acid/lauryl methacrylate and stearyl methacrylate terpolymers of this invention.

A. Preparation of MA/AA/LMA terpolymer

A 2 liter, 4-necked flask was equipped with a mechanical stirrer, condenser, addition funnels and thermometer. Maleic anhydride (49.05 g, 500 mmol) was dissolved in 325 mL of toluene, charged to the flask, and heated to reflux. Appropriate amounts of acrylic acid and lauryl methacrylate (see Table I) were dissolved in 70 mL of toluene and charged to the flask through an addition funnel over a 3 hour period. During this time, the polymerization mixture was maintained under reflux while a mixture of benzoyl peroxide (2.4 g; 10 mmol) in 50 mL of toluene was slowly added with stirring over a period of 5 hours. The reaction was permitted to continue for 2 hours at reflux and then a sample was taken to check for residual monomer. A mixture of benzoyl peroxide (2.4 g; 10 mmol) in 50 mL of toluene was added over a 3 hour period and the reaction was refluxed an additional 2 hours. When the polymerization was complete the toluene solution of the terpolymer was transferred to an addition funnel on a 4-necked, 5 liter flask equipped with a mechanical stirrer, condenser, Dean-Stark trap, and heating mantle. Water (750 mL) was charged to this flask and brought to reflux. The polymerization solution was slowly added to refluxing water with simultaneous steam injection to remove residual toluene and the pH was adjusted to 7.0. No residual lauryl methacrylate was detected in the product. Molecular weights were measured by gel permeation chromatography against sulfonated polystyrene standards in aqueous mobile phase.

The amounts of acrylic acid and lauryl methacrylate monomers employed herein are listed in Table I. The mole % hydrophobic monomer contents were 5, 10 and 15% for samples A, B and C respectively. Molecular weight characteristics of the terpolymers prepared from these monomers are listed in Table I.

B. Preparation of MA/AA/SMA terpolymers

The terpolymers were prepared by the same method as the terpolymers of Part "A" above except that different amounts of hydrophobic monomer (see Table I) were employed, and stearyl methacrylate was substituted for lauryl methacrylate. No residual stearyl methacrylate was detected in the product.

TABLE I

| | MA/AA/Hydrophobe Terpolymers | | | | |
|---|---|---|---|---|---|
| | | g of | g of | Molecular Weight | |
| Mole Ratio MA/AA/H$^a$ | Hydrophobic Monomer | Hydrophobic Monomer | Acrylic Acid | Weight Average | Number Average |
| 5/9.25/.75 | A. Lauryl Methacrylate | 19.1 | 66.7 | 8,400 | 3,220 |
| 5/8.5/1.5 | B. Lauryl Methacrylate | 38.2 | 61.3 | 8,490 | 3,060 |
| 5/7.75/2.25 | C. Lauryl Methacrylate | 57.2 | 55.8 | 9,300 | 3,200 |
| 5/9.25/.75 | D. Stearyl Methacrylate | 25.4 | 66.7 | — | — |
| 5/8.5/1.5 | E. Stearyl Methacrylate | 50.8 | 61.3 | — | — |
| 5/7.75/2.25 | F. Stearyl Methacrylate | 76.2 | 55.8 | — | — |

$^a$MA/AA/H = Maleic anhydride/acrylic acid/hydrophobic monomer.

EXAMPLE 2

This example illustrates the capacity of the polycarboxylate terpolymers of Example 1 for calcium sequestration.

Aliquots of solutions containing 0.1, 0.2, 0.3 or 0.4 g/l of the experimental and control polymers were each treated with solutions of calcium chloride in water, containing, respectively, 60 and 120 ppm calcium ion. A calcium ion selective electrode (Radiometer F2002 Calcium Selectrode, Radiometer A/S, Copenhagen, Denmark) was used to measure the free calcium ion concentration of the treated solutions.

The polymers tested for calcium ion sequestration included the terpolymers A-F of Example 1 and Sokalan ® CP-7 (a trademark registered to BASF Corporation and used in connection with a copolymer of acrylic acid and maleic acid that is used commercially as a detergent builder in powdered detergents).

Figure 1:
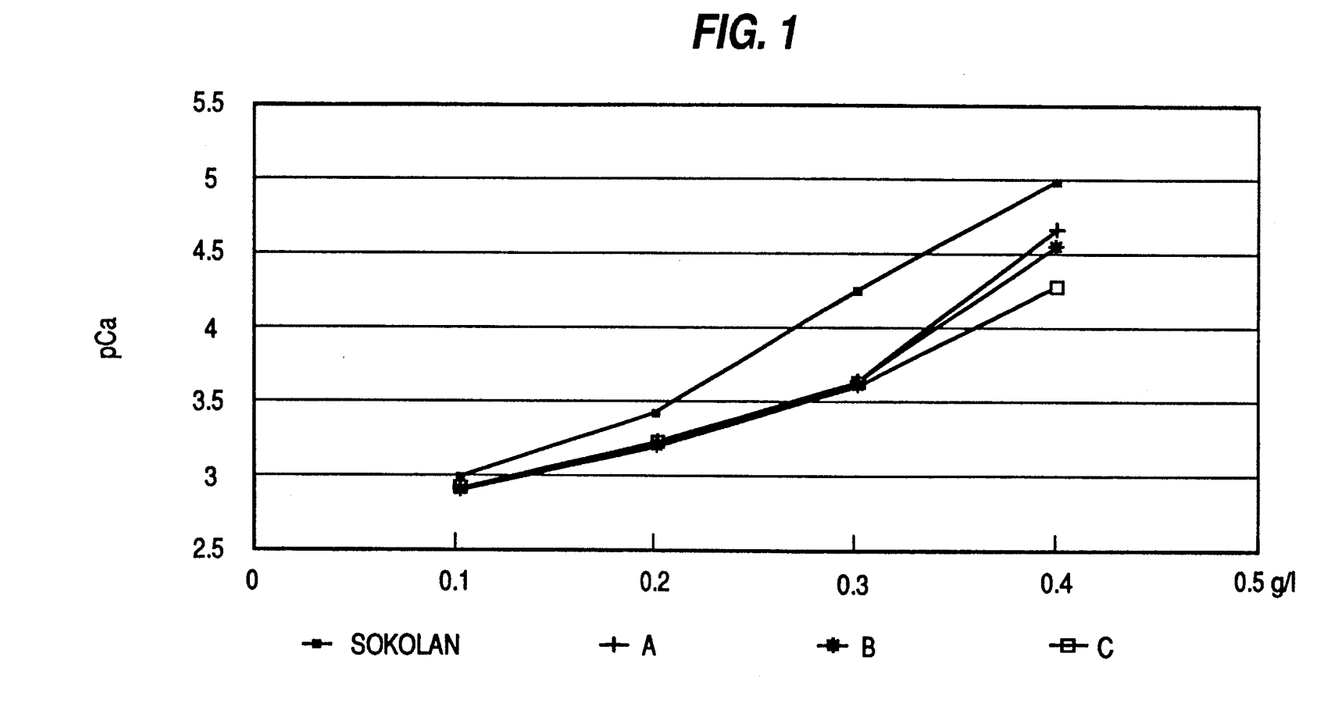

Results expressed as pCa are set forth in Table II and FIG. 1. All treatments resulted in higher pCa (indicating lower concentration of free calcium ion remained in solution following treatment) as the treatment level was increased. Overall, the terpolymers A-F effectively sequestered calcium ions. The Sokalan ® CP-7 builder was more effective at the higher polymer concentrations which were tested.

TABLE II

| Calcium Sequestration at 60 ppm and 120 ppm calcium ion | | | | | |
|---|---|---|---|---|---|
| | | pCa | | | |
| | Calcium ion | Treatment Level (g/l) | | | |
| Builder$^a$ | ppm | 0.1 | 0.2 | 0.3 | 0.4 |
| Sokalan ® | 60 | 3.74 | 5.10 | 6.21 | 6.73 |
| CP-7 | 120 | 3.00 | 3.43 | 4.23 | 4.98 |
| Terpolymer | 60 | 3.52 | 4.26 | 5.10 | 6.16 |
| A (Lauryl) | 120 | 2.92 | 3.20 | 3.63 | 4.62 |
| Terpolymer | 60 | 3.55 | 4.31 | 5.24 | 5.91 |
| B (Lauryl) | 120 | 2.93 | 3.21 | 3.60 | 4.53 |
| Terpolymer | 60 | 3.58 | 4.42 | 5.39 | 5.97 |
| C (Lauryl) | 120 | 2.94 | 3.23 | 3.63 | 4.25 |
| Terpolymer | 60 | 3.58 | 4.23 | 5.14 | 5.63 |
| D (Stearyl) | 120 | 2.95 | 3.18 | 3.54 | 4.01 |
| Terpolymer | 60 | 3.51 | 4.21 | 5.18 | 5.75 |
| E (Stearyl) | 120 | 2.91 | 3.14 | 3.53 | 3.95 |
| Terpolymer | 60 | 3.53 | 4.19 | 5.16 | 5.74 |
| F (Stearyl) | 120 | 2.89 | 3.12 | 3.40 | 3.82 |

$^a$Terpolymers were in sodium salt form.

Results also are shown in FIG. 1 which graphically illustrates the relative calcium ion sequestration capacity of the terpolymers over a range of polymer treatment levels at 120 ppm calcium ion.

EXAMPLE 3

This example illustrates the preparation of liquid household laundry detergent compositions employing the builders disclosed herein.

Liquid detergent compositions for household laundry use are prepared according to the following formulations:

TABLE III

Liquid Laundry Detergents

| Component | % by Weight in Formulation Formula No: | | | | | |
|---|---|---|---|---|---|---|
| | 1 | 2 | 3 | 4 | 5 | 6 |
| Actives | | | | | | |
| Sodium $C_{11}$-$C_{15}$ Alkylbenzene Sulfonate | 8 | 17 | 10 | | | 7 |
| Alcohol Ethoxy Sulfate[a] | 12 | | 6 | | | 1 |
| Alcohol Ethoxylate[b] | 8 | 7 | 8 | 16 | 8 | 4 |
| Alkylpolyglycoside[c] | | | | | 16 | 15 |
| Builders | | | | | | |
| Trisodium Citrate | 0-15 | 0-15 | 0-10 | 0-20 | 10 | 10 |
| Soap | 0-10 | 0-15 | | | 5 | 4 |
| Carboxymethyloxysuccinate, trisodium | | | | | 10 | 0-20 |
| Oxydisuccinate, tetrasodium | | | | | | 6 |
| MA/AA/Hydrophobe terpolymers[f] | 5-15 | 2-20 | 2-15 | 1-10 | 5 | 2-15 |
| Buffers | | | | | | |
| Monoethanolamine | 1 | 2 | 2 | 0-4 | | 2 |
| Triethanolamine | | | 2 | | 4 | 4 |
| Sodium Carbonate | | | | | | 1 |
| Enzymes | | | | | | |
| Protease (Savinase, Alcalase, etc.) | 1 | — | 1 | 0.5 | 1 | 0.75 |
| Amylase (Termamyl) | 0.5 | — | — | 0.5 | 1 | 0.5 |
| Lipase (Lipolase) | 1 | — | — | 0.5 | 1 | 1 |
| Enzyme Stabilizers | | | | | | |
| Borax Pentahydrate | | | 3.5 | | 4 | 4 |
| Glycerol | | | 4 | | 6 | 5 |
| Propylene Glycol | 10 | | | 10 | 2 | 5 |
| Formic Acid | 1 | | | 1 | | 1 |
| Calcium Chloride | 1 | | 1 | 1 | 1 | 1 |
| Softeners & Antistats | | | | | | |
| Quaternary Amines (Arquad 2HT) | | | | 2 | | |
| Ethoxylated Amine[d] | 1 | | | 2 | 1 | |
| Alkyldimethyl Amine Oxide[e] | | | | 1.5 | | |
| Compatibilizing Agents | | | | | | |
| Na Xylene Sulfonates | 3 | 6 | 3 | 2 | | 3 |
| Ethanol | 10 | | 2 | 8 | 3 | 3 |
| Fluorescers Tinopal UNPA | 0.25 | 0.2 | 0.25 | 0.25 | 0.2 | 0.15 |
| Perfume | 0.2 | 0.15 | 0.1-0.3 | 0.2 | 0.25 | 0.1-0.25 |
| Water | To Balance | | | | | |

[a]Sulfated Alfonic ® 1412-60 (12-14 C alcohol ethoxylate, containing 60% ethylene oxide by weight, sodium salt.)
[b]Alfonic ® 1412-70 (12-14 C alcohol) ethoxylate.
[c]APG 300 (obtained from Horizon Chemical).
[d]Varonic ® U202 (obtained from Sherex Corporation).
[e]Ammonyx MO (obtained from Stepan Chemical).
[f]See, e.g., Example 1 for preparation and description of terpolymers.

EXAMPLE 4

This example demonstrates the compatibility and stability of the terpolymers in liquid detergent formulations, and terpolymer stability upon storage.

The compatibility and stability of the terpolymers listed in Table I, above, were evaluated in liquid detergent formulation "2" of Example 3. The formulations were blended and the compatibility was determined by visual observation, initially and after storage. Polymers which were not compatible became hazy, precipitated or separated into different phases. Compatible builders remained in a clear, dispersed state. Unstable polymers lost compatibility upon storage. The results of compatibility tests are shown in Table IV. The results show that the terpolymers are compatible and stable in a typical liquid detergent formulation.

TABLE IV

| | Liquid Detergent Compatibility[c] | | |
|---|---|---|---|
| | % in | Observations | |
| Builder[b] | Formulation[a] | Initial | 30 days[d] |
| Terpolymer | 4 | phased | — |
| A (5% lauryl) | 8 | phased | — |
| Terpolymer | 4 | clear | stable[e] |

TABLE IV-continued

| | Liquid Detergent Compatibility[c] | | |
|---|---|---|---|
| | % in | Observations | |
| Builder[b] | Formulation[a] | Initial | 30 days[d] |
| B (10% lauryl) | 8 | clear, very viscous (solid) | — |
| Terpolymer | 4 | clear | stable[e] |
| C (15% lauryl) | 8 | clear | — |
| Terpolymer | 4 | phased | — |
| D (5% stearyl) | 8 | phased | — |
| Terpolymer | 4 | clear | stable[e] |
| E (10% stearyl) | 8 | — | — |
| Terpolymer | 4 | phased | — |
| A (5% lauryl) | 8 | phased | — |
| Terpolymer | 4 | hazy | stable[e] |
| F (15% stearyl) | 8 | phased | — |

[a]Detergent formulation No. "2" of Example 3.
[b]Terpolymers were prepared by method of Example 1 and are described in Table I.
[c]Compatibility was measured at pH = 8.0.
[d]Detergents were stored at 50° C. for 30 days.
[e]Samples also were subjected to 3 freeze-thaw cycles. Some separation was observed after the second cycle, but terpolymers were easily returned to a clear solution and did not separate again.

To measure the stability of the ester moieties, aqueous solutions of the terpolymers were adjusted for pH by the addition of a base and stored at 50° C. for 30 days. At the end of the 30 day test period, the pH of the solution was rechecked. The solution was analyzed for alcohol hydrolysis fragments resulting from possible hydrolysis of the ester moieties. The results indicate that even at pH 11-12 and 50° C. for 30 days, a maximum of 4% of the ester groups were hydrolyzed. See Table V for results.

TABLE V

| Terpolymer Solutions[a] | Base[c] | Terpolymer Stability[b] | | Observations[d] |
|---|---|---|---|---|
| | | pH Initial | Final[d] | |

| | | % Hydrolysis | | |
|---|---|---|---|---|
| Terpolymer B (10% lauryl) 13.5% solids | NaOH Mono-ethanolamine | 12.0 11.0 | 10.73 11.0 | 0.1%[e] 2.0% |
| Terpolymer C (15% lauryl) 7.6% solids | NaOH Mono-ethanolamine | 12.0 11.0 | 11.31 11.0 | 0.2%[f] 4.0% |
| Terpolymer E (10% stearyl) 7.5% solids | NaOH | 12.0 | — | Sl. turbidity |
| Terpolymer F (15% stearyl) 3.1% solids | NaOH | 12.0 | — | Sl. turbidity |

[a]Terpolymers were prepared by method of Example 1 and are described in Table I.
[b]Terpolymer stability was tested in aqueous solutions of terpolymer.
[c]Terpolymer containing solutions were initially adjusted to pH = 12.0.
[d]After storage at 50° C. for 30 days.
[e]After storage, sample contained 25 ug/ml lauryl alcohol.
[f]After storage, sample contained 100 ug/ml lauryl alcohol.

EXAMPLE 5

This example illustrates that the process herein provides optimum builder calcium binding properties and detergent compatibility.

A. Preparation of Polymer

Maleic anhydride/acrylic acid/lauryl methacrylate polymers were prepared according to Example 1, Part A, above, except that the initial monomer charge and the rates of additional monomer charges were varied as set forth in Table VI.

As shown in Table VI, the hydrophobic monomer was slowly added to the reaction vessel over a period from 2 to 4.5 hours. Where all of the maleic anhydride was initially charged to the reaction vessel, acrylic acid was added slowly over a period from 2 to 4.5 hours. If a portion or all of the maleic anhydride was withheld from the vessel, a mixture of the withheld maleic anhydride and acrylic acid was added slowly over 2 to 4 hours.

TABLE VI

| Builder Sample | % MA in Initial Charge | Hours of Slow Addition/Charge: | | | Calcium Binding pK[a] | Compatibility Surfactant Blend[b] | | | | | |
|---|---|---|---|---|---|---|---|---|---|---|---|
| | | AA/MA | AA | LMA | | 1 | 2 | 3 | 4 | 5 | 6 |
| Sokalan ® CP5 | Control | | | | 6.35 | N | N | N | N | N | N |
| Sokalan ® CP7[e] | Control | | | | 7.12 | — | — | — | — | — | — |
| Sodium Citrate | Control | | | | 3.62 | | | | | | |
| 49 A | 100 | — | 2 | 4 | 6.38 | N | | | N | | |
| 49 B | 100 | — | 4 | 4 | 6.70 | | | | | | N |
| 49 C | 50 | 3 | — | 3 | 6.73 | N | N | N | N | N | |
| 51 A | 0 | 2 | — | 4 | 6.33 | | | | | | |
| 51 B | 0 | 4 | — | 4 | 6.30 | | | | | N | N |
| 51 C | 50 | 3 | — | 3 | 6.70 | | | | | | |
| 53 A | 0 | 2 | — | 2 | 7.02 | | | | | | N |
| 53 B | 100 | — | 2 | 2 | 6.52 | | | | | | |
| 53 C | 50 | 3 | — | 3 | 6.59 | | | | | | |
| 57 A | 0 | 4 | — | 2 | 6.41 | | | | | N | |
| 57 B | 100 | — | 4 | 2 | 6.50 | | | N | | | |
| 57 C | 50 | 3 | — | 3 | 6.60 | | | | | | |
| 49 A-2[c] | 100 | — | 2 | 4 | 7.40 | | | | | N | |
| 51 A-2[c] | 0 | 2 | — | 4 | 7.04 | | | | | | |
| 62 A[d] | 100 | — | 3 | 3 | 6.47 | N | | | | | |
| 63 A | 100 | — | 3 | 3 | 5.89 | | | | | | |
| 77 A | 100 | — | 3.5 | 3.5 | 6.30 | | | | | | |
| 77 B | 100 | — | 4.5 | 4.5 | 6.43 | | | | | | |
| 81 A | 66.7 | 3.25 | — | 3 | 6.16 | | | | | | |
| 81 B | 88.3 | 3.5 | — | 3 | 6.32 | N | | | | | |
| 81 C | 100 | 4 | — | 3 | 6.43 | | | | | | |

[a]pK is the intrinsic calcium binding constant, i.e., the equilibrium constant for the polymer-calcium complex extrapolated to zero occupied binding sites.
[b]See Table VII. Builders were not compatible in blends marked "N". All other builders were compatible.
[c]Duplicate samples of 49 A and 51 B, respectively.
[d]Sample 62 A was prepared by the method of Example 1, employing 10% lauryl methacrylate (corresponding to Sample "B" Table I).
[e]Not tested for compatibility.

B. Calcium Sequestration Testing

The terpolymers of Part A, above, were tested for calcium sequestration employing a calcium ion selective electrode (Radiometer F2002 Calcium Selectrode, Radiometer A/S, Copenhagen, Denmark)). Terpolymer solutions containing 100 mg terpolymer (or Sokalan ® or citrate control) and 117 mg sodium chloride in 100 ml of water were adjusted to a pH of 10.5 with ammonium hydroxide. The solutions were treated with sufficient calcium ion solution (0.1M calcium) to reach free calcium ion concentration levels of 4, 4.5 or 5.0 mmol Ca/gram of terpolymer. The calcium treatment was carried out with agitation at room temperature by adding 0.2 mL of the calcium ion solution every two minutes. Calcium ion concentration readings were taken just prior to the addition of each aliquot to determine when sufficient calcium ion solution had been added to reach 4, 4.5 or 5.0 mmol Ca/gram of terpolymer. The pK (i.e., intrinsic binding constant) for each terpolymer and the control was calculated from a plot of the electrode readings, wherein $$pCa + \log\left(\frac{Z}{1-Z}\right)$$

was plotted on the Y-axis and Z was plotted on the X-axis. The pK is the Y-intercept, extrapolated from the linear portion of the curve; pCa is the free calcium ion concentration; and Z is the fraction of occupied binding sites on the terpolymer and the controls. Results are shown in Table VI as the pK. As the pK increases, and as total calcium sequestration capacity of the terpolymer increases, the effectiveness of the terpolymer as a builder increases.

Figure 2:
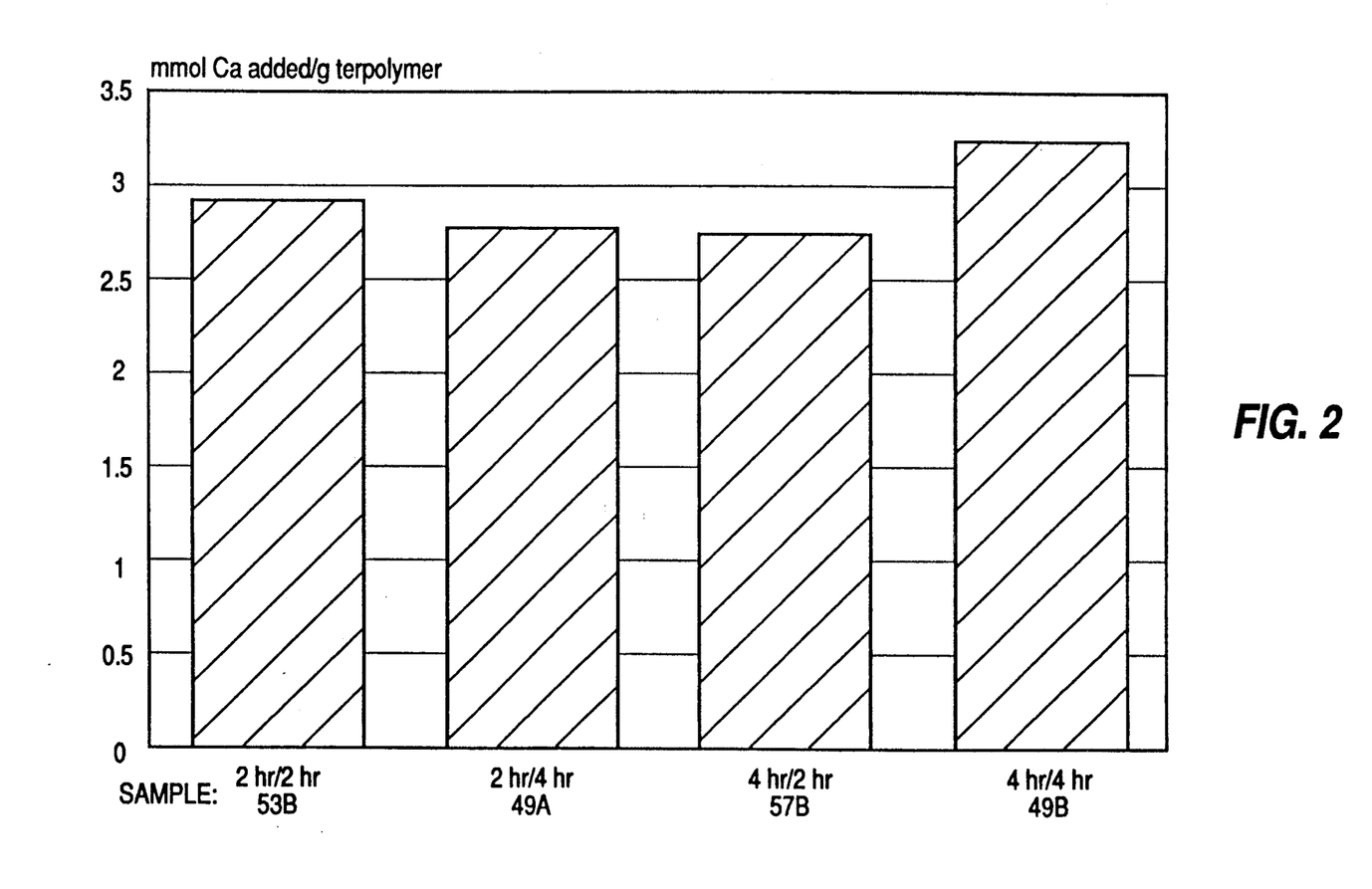
FIGS. 2 and 3 illustrate the effect of monomer equal slow add time during the polymerization process on calcium binding capacity of the interpolymers for samples 62A, 77A, 77B, 53B, 49A, 57B and 49B, which are described in Table VI herein.
Figure 3:
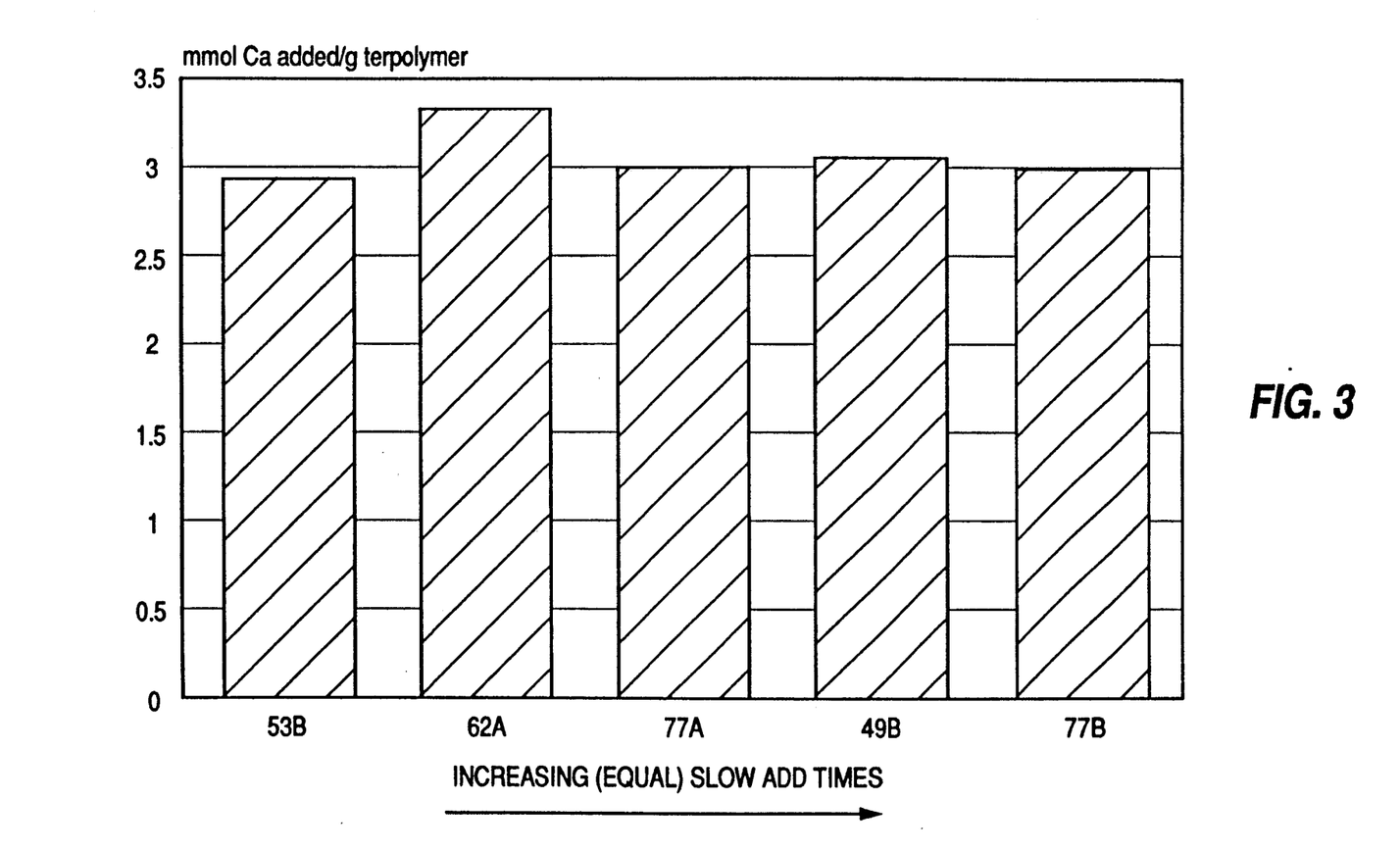
Figure 4:
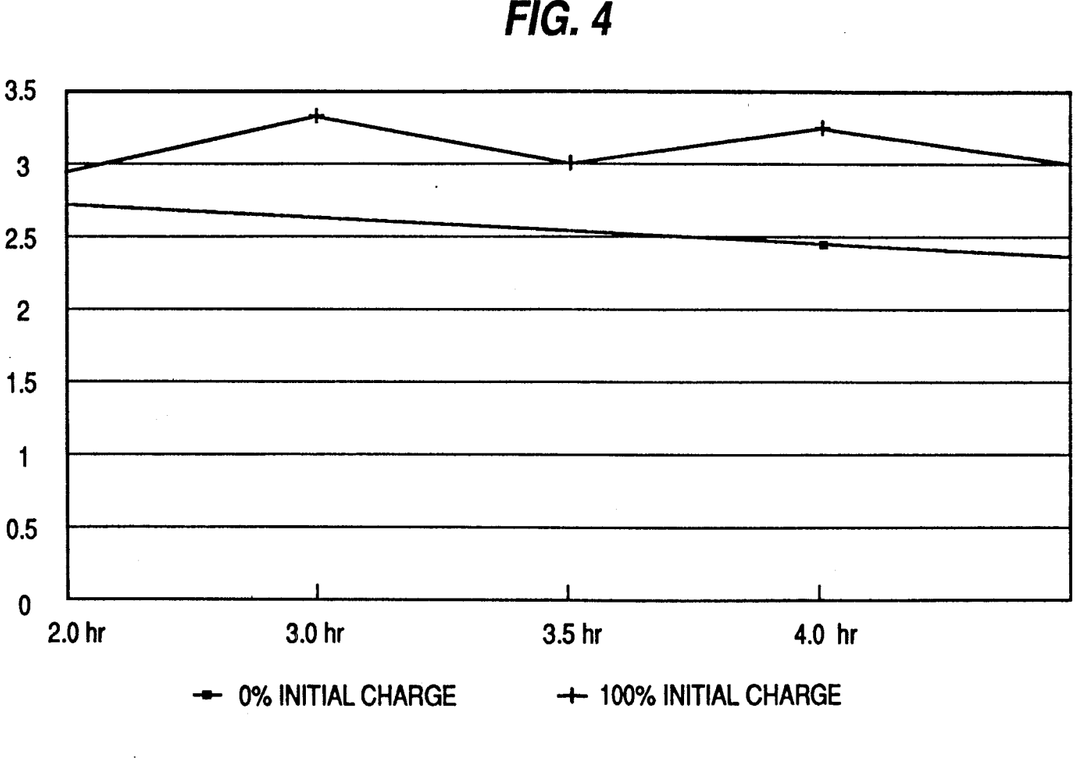
FIG. 4 illustrates the effects of percent initial monomer charge and monomer slow add time during the polymerization process on calcium binding capacity of the interpolymers.

The amount of calcium ion added/gram of terpolymer to reach a pCa of 4.5 mmol Ca/gram of terpolymer is shown in FIGS. 2 to 4 for a variety of process variables. All processes employed in this example produced polymers having acceptable pKs (i.e., greater than 6.00), which were significantly better than the citrate control (pK=3.62) and comparable to the Sokalan ® controls (pKs=6.35 and 7.12). However, the total calcium binding capacity varied with the process used for polymerization.

The optimum total calcium binding properties were observed where both the carboxylic acid monomer(s) and the hydrophic monomer were each added over an equal period of time, preferrably over a 3–4 hour period, and where all of the maleic anhydride monomer was contained in the initial charge.

C. Liquid Detergent Compatibility Testing

The polymers prepared by the methods of Part A, above, were tested at 5% by weight in the surfactant blends listed in Table VII, below. The blends each contained 24%, by weight, surfactant, with the balance being water.

TABLE VII

| Surfactant Blend | Sodium $C_{11}$-$C_{15}$ Alkylbenzene Sulfonate | Neodol ® 25-9[a] | Neodol ® 25-3S[b] |
|---|---|---|---|
| 1 | 10 | 8 | 6 |
| 2 | 6 | 12 | 6 |
| 3 | 10 | 4 | 10 |
| 4 | 16 | 8 | 0 |
| 5 | 12 | 6 | 6 |
| 6 | 6 | 6 | 12 |

[a] A registered trademark of Shell Chemical Company, Houston, Texas.
[b] A registered trademark of Shell Chemical Company, Houston, Texas.

Results are shown in Table VI. A "N" indicates that the polymer was not compatible with the surfactant blend. The Sokalan ® CP5 control was not compatible. The citrate control and polymers 51A, 77A, 77B, 81A and 81C were compatible in all surfactant blends. Polymers 81B, 62A, 49A-2, 57A, 53A and 49B were compatible in five of the six blends. Thus, slow addition (over at least two hours) over an equal period of time of the hydrophobic monomer and the carboxylic acid monomer to an initial charge of 100% of the maleic anhydride provided the optimum detergent compatibility.

EXAMPLE 6

This example illustrates that the process employed herein provides unique builder compatibility in liquid detergent formulations.

A. Preparation of MA/AA/LMA terpolymers

An 85% MA/AA (1.0:2.0 molar ratio): 15% lauryl methacrylate terpolymer was prepared by an aqueous polymerization technique for comparison with the terpolymers prepared by the process of this invention.

In the aqueous polymerization process, deionized water (250 g) and maleic anhydride (147 g) were charged to a 2 liter reaction vessel equipped with a stirrer, thermometer and condenser with stirring. Sodium hydroxide (60 g) was dissolved in deionized water (125 g) and added to the reaction vessel. Isopropanol (250 g) was added to the vessel and heated to reflux. A mixture of acrylic acid (216 g) and lauryl methacrylate (212 g) was fed into the vessel over three hours. An initiator feed of sodium persulfate (18 g) in deionized water (100 g) was added simultaneously over three and a half hours.

The contents of the vessel were held at reflux for one hour. The isopropanol was removed azeotropically under reduced pressure (365 g of distillate collected). Cooling deionized water (325 g) and 48% sodium hydroxide (325 g) were added to give 1850 g of 40% polymer at pH=7.0. The polymer had an average molecular weight of 3750 and an average molecular number of 1050. The polymer contained 0.62% residual maleic acid and 0.05% residual lauryl methacrylate.

B. Liquid Detergent Compatibility Test

At 4% of detergent formulation "2", Table III above, the terpolymer of part "A", above, precipitated from the formulation. A control containing 5% of terpolymer B of Example 1, Table I, remained clear. The terpolymer of part "A" was not compatible with any of the surfactant blends listed in Table VII. Thus, the process set forth in Example 1 unexpectedly provides unique terpolymers which are compatible in liquid detergent formulations.

EXAMPLE 7

This example illustrates the preparation and detergency of household laundry detergent compositions employing a variety of builders as controls and terpolymer 77B of Table VI, Example 5 as an experimental builder.

Liquid detergent compositions suitable for use as household laundry detergent were prepared according to the following formulation:

| Component | % by Weight in Formulation |
|---|---|
| Sodium Alkylbenzene Sulfonate (C11.5) | 10.0 |
| Neodol 25-9 | 8.0 |
| Neodol 25-3S | 6.0 |
| Sodium Xylene Sulfonate | 3.0 |
| Monoethanolamine | 2.0 |
| Triethanolamine | 2.0 |
| Sodium Borate Decahydrate | 2.7 |
| Propylene Glycol | 4.0 |
| Builder | 0–20 |
| Sodium Hydroxide | to pH 10 |
| Water | to 100% |

Detergency evaluations were conducted in a Terg-O-tometer (US Testing Company) employing detergency monitor cloths sold by Test Fabrics Company. Fatty/particulate soil cloths were used. Water hardness was adjusted to 60, 120, or 180 ppm polyvalent cations (calculated as calcium carbonate; 2:1 ratio of Ca++:Mg++). Water at the appropriate hardness was first added to the Terg-O-tometer beaker. The appropriate amounts of the detergent formulation was then added to make one liter of detergent having a total concentration of 2.0 g/l.

Builders were dosed at the appropriate level into the wash liquor. After the test solution reached the desired wash temperature (40° C.), the detergency monitor cloths were introduced (4-8 cloths per beaker) and the wash cycle begun (100 rpm). After washing 15 minutes, the cloths were rinsed for 1 minute, dried, and their reflectances were recorded using a Gardner reflectometer (Model Colorguard System 05). Using the reflectances of the soiled and washed cloths, $\Delta R$ was calculated according to the following relationship:

$$\Delta R = R_{washed} - R_{soiled}$$

As the effectiveness of the detergent formulation improves, the $\Delta R$ value increases.

As the percent builder increased (from 0% to 5, 10, 15 and 20%), the $\Delta R$ increased for all controls and the terpolymer disclosed herein. At all percentages, the terpolymer builder was superior to the citrate builder and equivalent to the oxydisuccinate and Sokalan ® CP7 builders in detergency.

The detergency results at 0 and 10% builder are given in Table VIII for the fatty/particulate cloths at three water hardnesses. It is clear from these results that the polymer of this invention provides substantial detergency building across all water hardnesses. The terpolymer is similar in effectiveness to oxydisuccinate and Sokalan ® CP7, and superior to sodium citrate.

TABLE VIII

Builder Detergency in Model Formulation[a]
$\Delta R$ Values

| ppm 2:1 Ca++:Mg++ | Oxydi-succinate | Terpolymer[b] | Ci-trate | Sokalan ® CP7 |
|---|---|---|---|---|
| Control | 18.6 | 18.6 | 18.6 | 18.6 |
| 60 ppm | 22.0 | 21.4 | 19.7 | 20.6 |
| Control | 14.3 | 14.3 | 14.3 | 14.3 |
| 120 ppm | 20.1 | 18.8 | 17.4 | 21.4 |
| Control | 14.7 | 14.7 | 14.7 | 14.7 |
| 180 ppm | 17.4 | 14.8 | 13.4 | 18.4 |

[a]Formulation contained 10% builder.
[b]Acrylate/maleate/lauryl methacrylate terpolymer (77 B of Table VI, Example 5) prepared by the method of Example 1.

EXAMPLE 8

This example illustrates the preparation of representative, powdered detergent compositions for general cleaning which employ the builders disclosed herein.

Household detergent compositions for general cleaning use are prepared according to the following formulations:

TABLE IX

| Component | % by Weight in Formulation Formula No: | | | | | |
|---|---|---|---|---|---|---|
| | 1 | 2 | 3 | 4 | 5 | 6 |
| Actives | | | | | | |
| Sodium $C_{11}$-$C_{13}$ Alkylbenzene Sulfonate | 11 | 11.5 | 17 | 11 | 15 | |
| Alcohol Ethoxy Sulfate[a] | | 5.5 | | | | |
| Primary Alcohol Sulfate | 10 | | | 9 | 5 | |
| Alcohol Ethoxylate[b] | | 3 | | 2 | 3 | 10 |
| Soap | 1 | | | | 1 | |
| Builders | | | | | | |
| Sodium Tripolyphosphate | | | | | 25 | |
| Aluminosilicates, e.g., Zeolite 4A | 10-35 | 0-15 | 5-20 | 0-12 | | |
| Polycarboxylate, e.g., CP-5 | 0-3 | | | | | |
| MA/AA/Hydrophobe terpolymers[d] | 2-25 | 2-25 | 2-25 | 2-25 | 5 | 2-20 |
| Buffers | | | | | | |
| Alkaline Silicate | 2-5 | 20 | 5 | 3-20 | 15 | 15 |
| Sodium Carbonate | 18 | 18 | 15 | 30 | 20 | 40 |
| Enzymes | | | | | | |
| Protease (Savinase, Alcalase, etc.) | 0.5 | 0-1 | 0.5 | 0.5 | 1 | 1 |
| Amylase (Termamyl) | 0.4 | | | 0.5 | 0.5 | |
| Lipase (Lipolase) | 1.0 | 0-1 | | 0.5 | 1 | 1 |
| Softeners & Antistats | | | | | | |
| Quaternary Amines (Arquad 2HT) | | | 2.4 | | | |
| Ethoxylated Amine[c] | | | 2 | | | |
| Swelling Clay | | | 10 | | | |
| Fluorescers | 0.15 | 0.2 | 0.25 | 0.15 | 1.5 | 1.5 |
| Tinopal AMS | | | | | | |
| Perfume | 0.1 | 0.2 | 0.1 | 0.1 | 0.1 | 0.1 |
| Fillers | | | To Balance | | | |
| Na sulfate | | | | | | |

[a]Sulfated Alfonic ® 1412-70.
[b]Neodol ® 25-9 (12-15 C alcohol, 9 mole ethylene oxide condensate).
[c]Varonic ® U202 (obtained from Sherex Corporation).
[d]Terpolymers are prepared by the method of Example 1 and are described in Table I.

Although emphasis has been placed on laundry detergent compositions in these examples, detergent compositions for all cleaning purposes are included within the scope of this invention. Various modifications and improvements on the compositions herein will become readily apparent to those skilled in the art. Accordingly, the scope and spirit of the invention are to be limited only by the claims and not by the foregoing specification.

We claim:

1. An interpolymer comprising repeating units of the structure:

wherein m is a mole fraction from 0.70 to 0.95; n is a mole fraction from 0.05 to 0.30; A and B are a polymerized residue of ethenically unsaturated carboxylic acid monomer(s), selected from monocarboxylic acids, dicarboxylic acids and their anhydrides and esters, and B is not A; and C is:

a polymerized residue of at least one monomer, selected from the group consisting of $C_8$–$C_{18}$ linear or branched alkyl ester(s) of ethylenically unsaturated carboxylic acid(s); $C_8$–$C_{18}$ alpha-olefin(s); and vinyl esters of $C_8$–$C_{18}$ carboxylic acid(s); the interpolymer being prepared by polymerizing the monomers in a solvent system in which the monomers and interpolymer are soluble, whereby the monomer of which C is the polymerized residue is instantaneously and homogeneously copolymerized with the carboxylic acid monomers.

2. The interpolymer of claim 1, wherein the interpolymer is prepared by slowly adding a charge comprising the monomer(s) of which C is the polymerized residue to the carboxylic acid monomer(s) over a period of time sufficient to permit instantaneous and uniform copolymerization of the monomers.

3. The interpolymer of claim 1, wherein the interpolymer is prepared by a process comprising the steps:
 (a) providing an initial charge comprising up to 100%, by weight, of at least one monomer of which A or B is the polymerized residue;
 (b) adding to the initial charge a charge comprising at least one monomer of which C is the polymerized residue; and
 (c) polymerizing the monomers in solution in the presence of an initiator and a non-haloalkane, hydrophobic solvent.

4. The interpolymer of claim 3, wherein the process further comprises the step of adding at least one monomer of which A or B is the polymerized residue simultaneously with the charge comprising at least one monomer of which C is the polymerized residue.

5. The interpolymer of claim 3, wherein the process further comprises the step of removing the solvent and recovering the interpolymer in dry form.

6. The interpolymer of claim 3, wherein the process further comprises the step of extracting the interpolymer into an aqueous solvent.

7. The interpolymer of claim 6, wherein the process further comprises the step of spray-drying the interpolymer.

8. The interpolymer of claim 6, wherein the process further comprises the step of azeotropic solvent removal.

9. The interpolymer of claim 4, wherein acrylic acid is simultaneously added with the monomer of which C is the polymerized residue.

10. The interpolymer of claim 4, wherein the monomer of which C is the polymerized residue is lauryl methacrylate.

11. The interpolymer of claim 4, wherein A is a polymerized residue of acrylic acid, B is a polymerized residue of maleic anhydride and C is a polymerized residue of lauryl methacrylate.

12. The interpolymer of claim 11, wherein the interpolymer has a molecular weight from about 3,000 to 15,000.

* * * * *